US010331596B2

(12) United States Patent
Loza

(10) Patent No.: US 10,331,596 B2
(45) Date of Patent: Jun. 25, 2019

(54) USB TYPE-C CONNECTOR WITH A SECONDARY PORT

(71) Applicant: Futurewei Technologies, Inc., Plano, TX (US)

(72) Inventor: Steven Loza, Menifee, CA (US)

(73) Assignee: Futurewei Technologies, Inc., Plano, TX (US)

( * ) Notice: Subject to any disclaimer, the term of this patent is extended or adjusted under 35 U.S.C. 154(b) by 92 days.

(21) Appl. No.: 15/258,879

(22) Filed: Sep. 7, 2016

(65) Prior Publication Data

US 2018/0067884 A1 Mar. 8, 2018

(51) Int. Cl.
*H04R 5/033* (2006.01)
*G06F 13/38* (2006.01)
*H04R 1/10* (2006.01)
*G06F 13/42* (2006.01)
*H01R 27/02* (2006.01)

(52) U.S. Cl.
CPC ........ *G06F 13/385* (2013.01); *G06F 13/4282* (2013.01); *H04R 1/105* (2013.01); *H04R 5/033* (2013.01); *H01R 27/02* (2013.01); *H04R 1/10* (2013.01)

(58) Field of Classification Search
CPC .. H04R 1/1033; H04R 1/1016; H04R 1/1058; H04R 13/6456; H04R 13/70; H04R 27/02; H04R 5/033; H04R 1/10; H04R 1/105; G06F 13/385; G06F 13/102; G06F 13/4282; G06F 13/382; G06F 13/4081; G06F 13/4068; G06F 2213/0042
See application file for complete search history.

(56) References Cited

U.S. PATENT DOCUMENTS 9,800,701 B1* 10/2017 Guillen .............. H04M 1/0274
2017/0109311 A1* 4/2017 Gerber .............. G06F 13/4081
2017/0194756 A1 7/2017 Chang

FOREIGN PATENT DOCUMENTS

| CN | 204179435 U | 2/2015 |
| CN | 104917016 A | 9/2015 |
| CN | 205178220 U | 4/2016 |
| CN | 105868139 A | 8/2016 |
| KR | 20100011150 U | 11/2010 |

OTHER PUBLICATIONS

PCT/CN2017/098537, ISR, Dec. 1, 2017.

* cited by examiner

*Primary Examiner* — Ernest Unelus
(74) *Attorney, Agent, or Firm* — Vierra Magen Marcus LLP

(57) ABSTRACT

The present disclosure relates to a USB type-C connector assembly including a connector and a secondary port. The connector assembly may be integrally attached a first device, such that the connector of the assembly may be used to affix the first device to the USB type-C port of a computing system such as a mobile phone. The secondary port of the assembly may be used to connect a second device to the USB type-C port of the computing system, thus enabling use of the first and second devices with the computing system through the single computing system USB type-C port.

15 Claims, 12 Drawing Sheets

USB TYPE-C CONNECTOR WITH A SECONDARY PORT

BACKGROUND

Mobile smart phones and computing systems in general have in the past included an audio jack receiving a 3.5 mm plug enabling audio output to a headset and audio input from a microphone. There is a recent trend away from using the 3.5 mm jack for audio input/output in favor of the USB type-C port currently provided in many mobile smart phones and computing systems. One disadvantage to the use of the USB type-C port for audio is that it may interfere with other uses of the type-C port, such as for example battery charging.

SUMMARY

In one embodiment, the present technology relates to a connector assembly for connecting to a USB type-C port of a user device, comprising: a USB type-C connector for connecting a first device to the user device through the USB type-C port of the user device; and a secondary port for receiving a connector of a second device to connect the second device to the user device through the USB type-C port of the user device.

In another embodiment, the present technology relates to a connector assembly for connecting to a USB type-C port of a user device, comprising: a first device integrally attached to the connector assembly and capable of operation with the user device; a USB type-C connector for connecting the first device to the user device through the USB type-C port of the user device; and a USB type-C secondary port for receiving a connector of a second device to connect the second device to the user device through the USB type-C port of the user device.

In a further embodiment, the present technology relates to a connector assembly for connecting to a USB type-C port of a user device, comprising: a first electrical circuit enabling operation of a first device with the user device; a USB type-C connector, coupled to the first electrical circuit, for connecting the first device to the user device through the USB type-C port of the user device; a second electrical circuit enabling operation of a second device with the user device; and a USB type-C secondary port, coupled to the second electrical circuit, for receiving a connector of the second device to connect the second device to the user device through the USB type-C port of the user device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The present technology, roughly described, relates to a USB type-C connector assembly including a connector and a secondary port. A USB type-C connector/port is a connector/port configured according to the USB type-C standard. The connector assembly may be integrally attached at an end of a cord of a variety of devices, such as for example an audio headset, audio microphone and battery charger. The connector of the assembly may be used to affix the attached device to the USB type-C port of a user device. A user device as used herein may include a computing system, such as a mobile phone, tablet, laptop and desktop computers. User devices may also include power adapters and other devices which may have a USB type-C port. The secondary port of the assembly may be used to connect a second device to the USB type-C port of the computing system. In particular, while the first device is connected to the USB port via the connector, a second device may be connected to the secondary port, thus enabling simultaneous use of the first and second devices with the computing system through the single computing system USB type-C port.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal," and forms thereof, as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

Figure 1:
FIG. 1 is a perspective view of a headset including a USB type-C connector assembly including a connector for connecting to a USB type-C port of a computing system, and the assembly including a secondary port allowing connection of a second device (not shown) to the USB type-C port of the computing system.

FIG. 1 is a perspective view of a USB type-C connector assembly 100 (within the dashed-lined circle) for connecting a device 102 to a USB type-C port 104 of a computing system 106. The connector assembly 100 may be integrally attached to the device 102, for example by a cord 108. Further details of the electrical connections of the device 102 to the connector assembly 100 are explained below. While the device 102 is shown as including a cord 108, it is understood that the device 102 may be directly affixed to the USB type-C connector assembly 100 without a cord 108 in further embodiments.

The device 102 shown in FIG. 1 is a headset for receiving audio signals from the computing system 106 upon connection of the connector assembly 100 to the port 104. However, it is understood the device 102 integrally attached to the connector assembly 100 may be a wide variety of other devices in further embodiments. Such other devices include but are not limited to a microphone, a battery charger, a memory card, an audiovisual device such as a television or disc player, and a connector cable for connecting the computing system 106 to another computing system such as for example a PC, laptop, tablet, server, smart phone, camera, video recorder, automobile computer or smart appliance.

The computing system 106 shown in FIG. 1 is a mobile smart phone including a USB type-C port 104. However, it is understood the computing system 106 may be a wide variety of other computing systems which may include a USB type-C port. Such other computing systems include but are not limited to a PC, laptop, tablet, server, camera, video recorder, automobile computer and smart appliance. An example of the components of a computing system 106 are set forth below with respect to FIG. 15.

Figure 2:
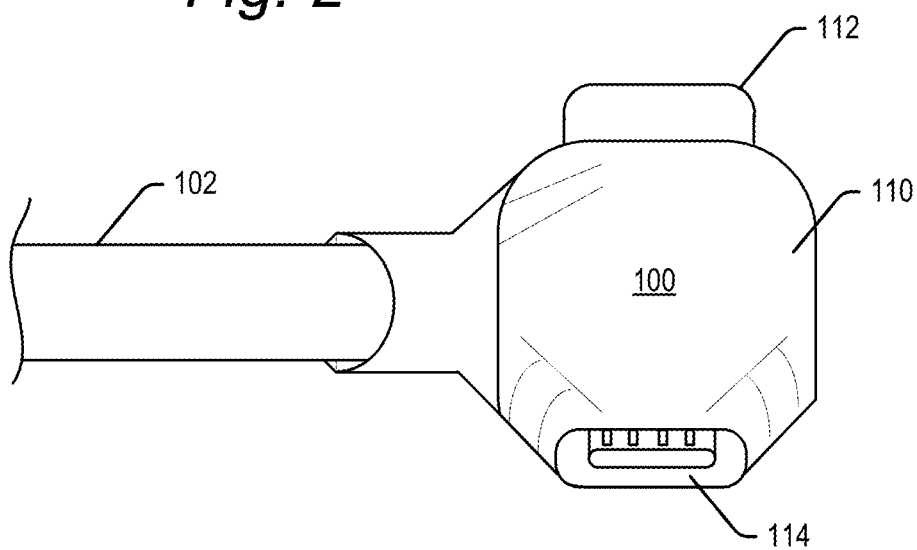
FIG. 2 is a front perspective view illustrating detail of the secondary port of the connector assembly according to embodiments of the present technology.
Figure 3:
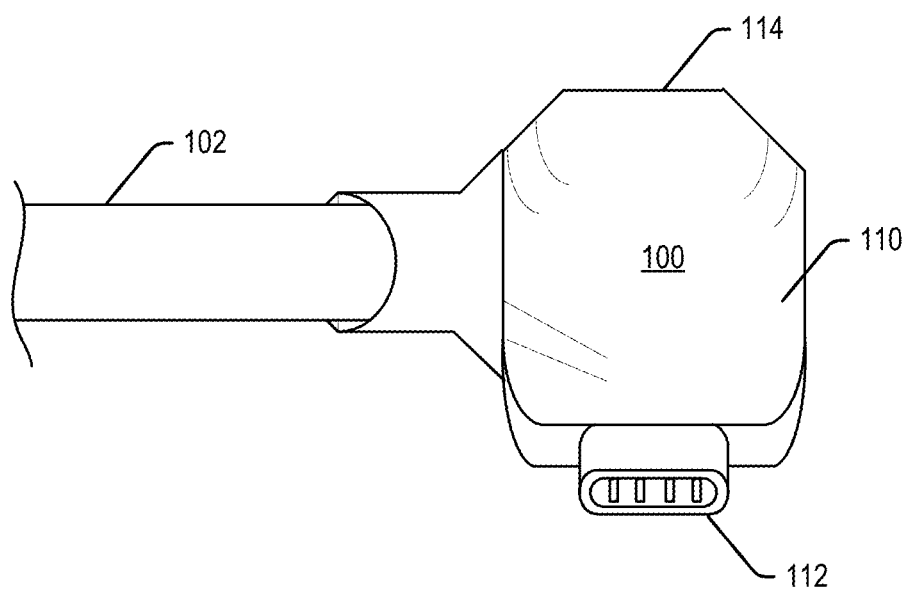
FIG. 3 is a rear perspective view illustrating detail of the connector of the connector assembly according to embodiments of the present technology.

FIGS. 2 and 3 are front and rear perspective views, respectively, of the connector assembly 100. The connector assembly 100 includes a housing 110 supporting a connector 112 and defining a port 114. The housing 110 also encloses a printed circuit board 130, explained below with reference to FIGS. 8-10B. The connector 112 is configured as a USB type-C connector plug for being received within a USB type-C port 104 of a computing system 106 (FIG. 1). The connector assembly 100 further includes a secondary port 114 configured as a USB type-C port or jack for receiving a USB type-C connector of a second device (not shown in FIG. 2 or 3, but explained now with reference to FIGS. 4-7).

Figure 4:
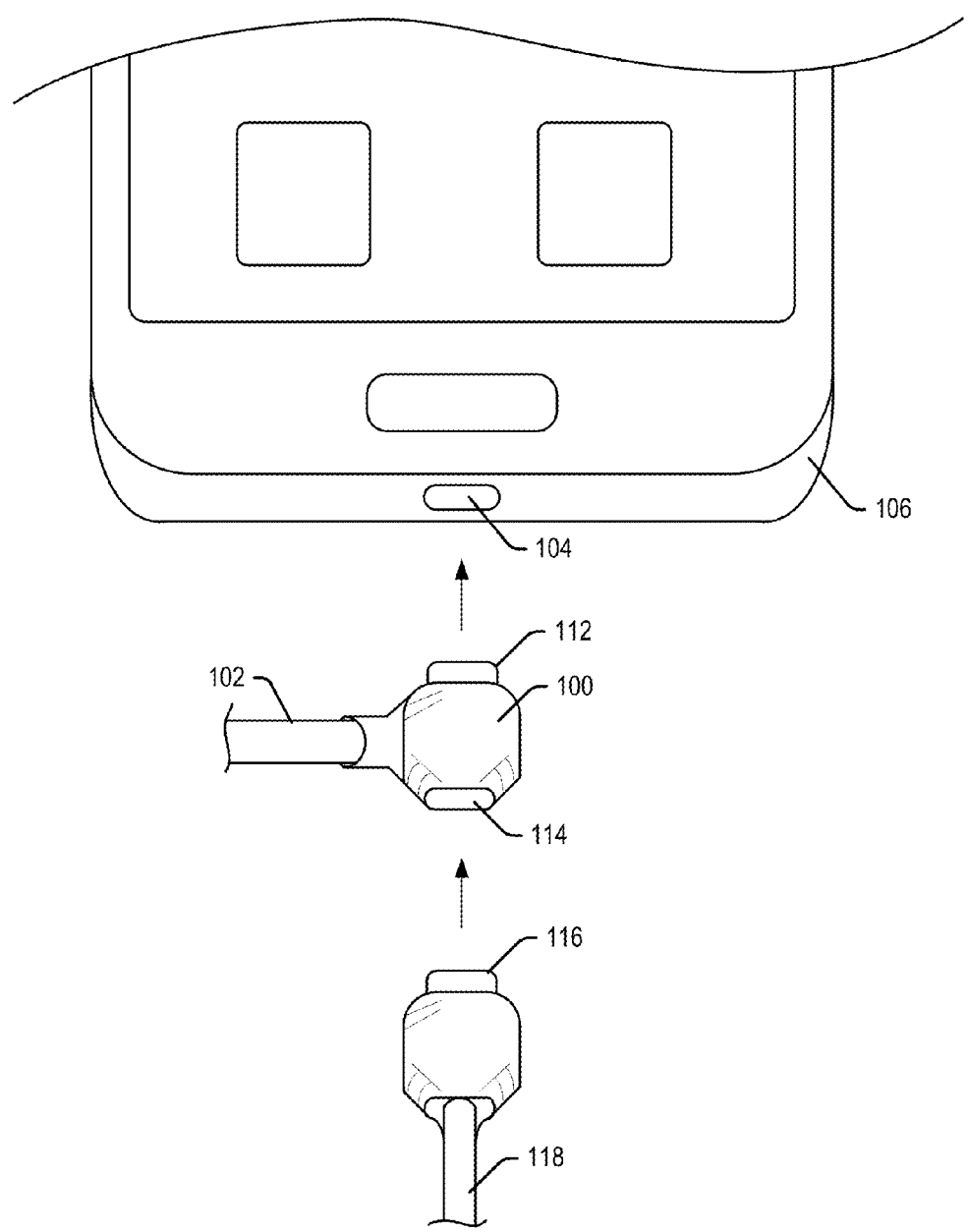
FIG. 4 is a perspective view of a USB type-C connector assembly in accordance with the present technology including a connector for mating within the USB type-C port of a computing system, and a secondary port for receiving the USB type-C connector of a second device.
Figure 5:
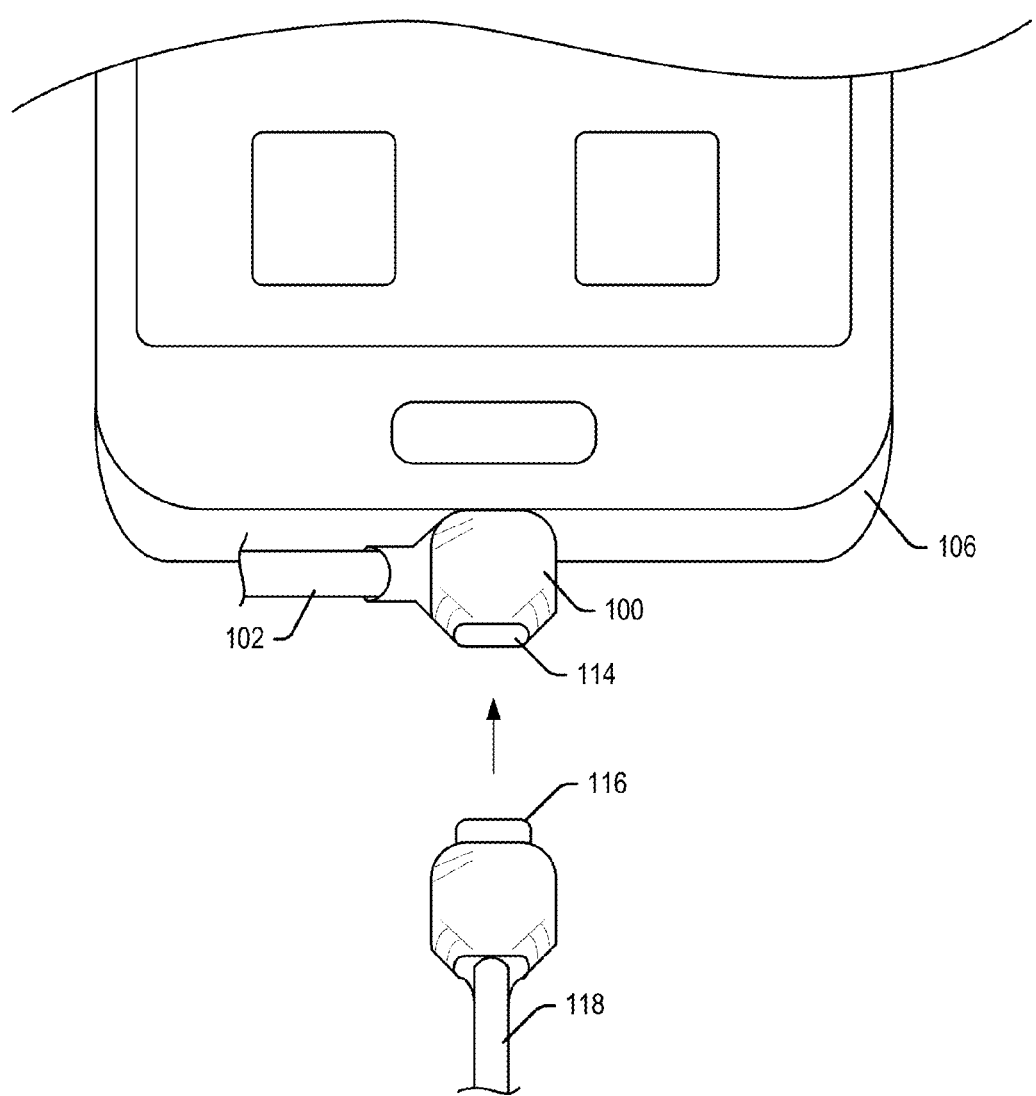
FIG. 5 is a perspective view of a USB type-C connector assembly in accordance with the present technology including a connector mated within the USB type-C port of a computing system, and a secondary port for receiving the USB type-C connector of a second device.
Figure 6:
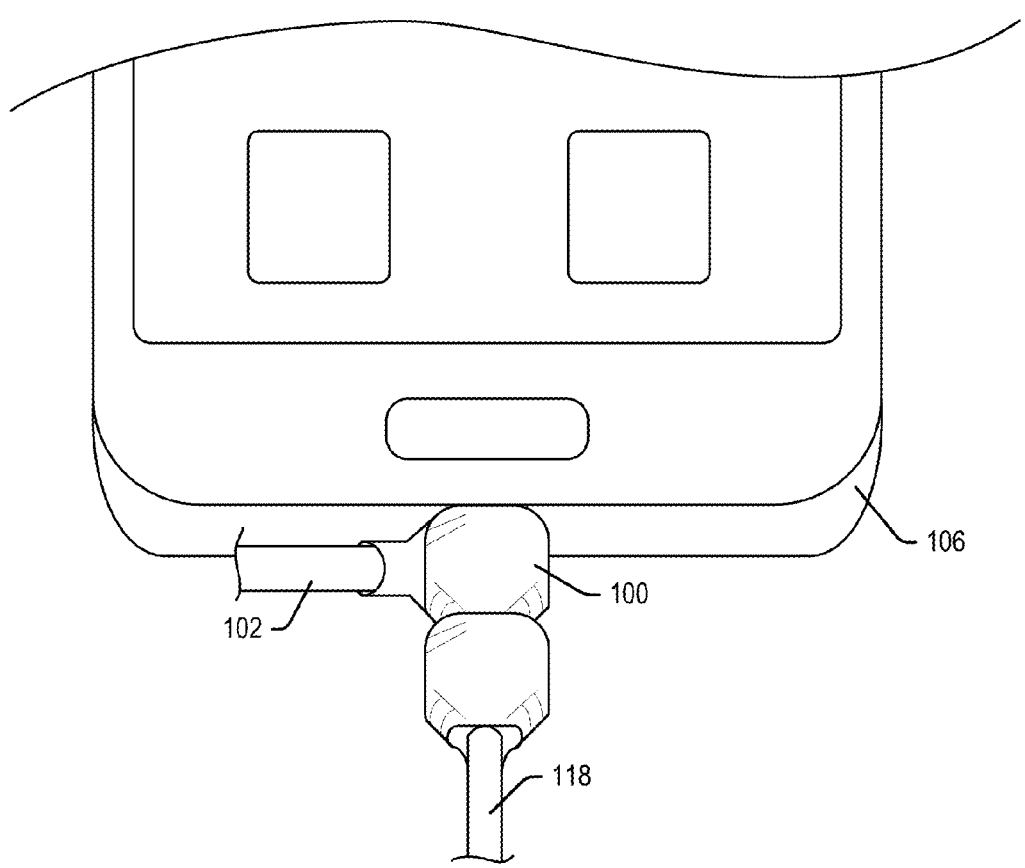
FIG. 6 is a perspective view of a USB type-C connector assembly in accordance with the present technology including a connector mated within the USB type-C port of a computing system, and a secondary port receiving the USB type-C connector of a second device.

FIG. 4 is a perspective view showing a portion of a computing system 106 including a USB type-C port 104, and showing a USB type-C connector assembly 100 integrally attached to a device 102. In the following description, device 102 is also referred to as a first device 102. FIG. 4 further shows a second device 118 including a USB type-C connector 116. The connector assembly 100 includes a connector 112 for being received within the port 104 to connect the first device 102 to computing system 106 as described above. FIG. 5 is a perspective view showing connection of the first device 102 to the computing system 106 via the connector assembly 100. The secondary port 114 of assembly 100 is provided to receive the connector 116 of the second device 118 to connect the second device 118 to the computing system 106 through the connector assembly 100. FIG. 6 is a perspective view showing connection of the second device 118 to the computing system 106 via the connector assembly 100. The second device 118 may be any of the devices described above with respect to device 102.

Figure 7:
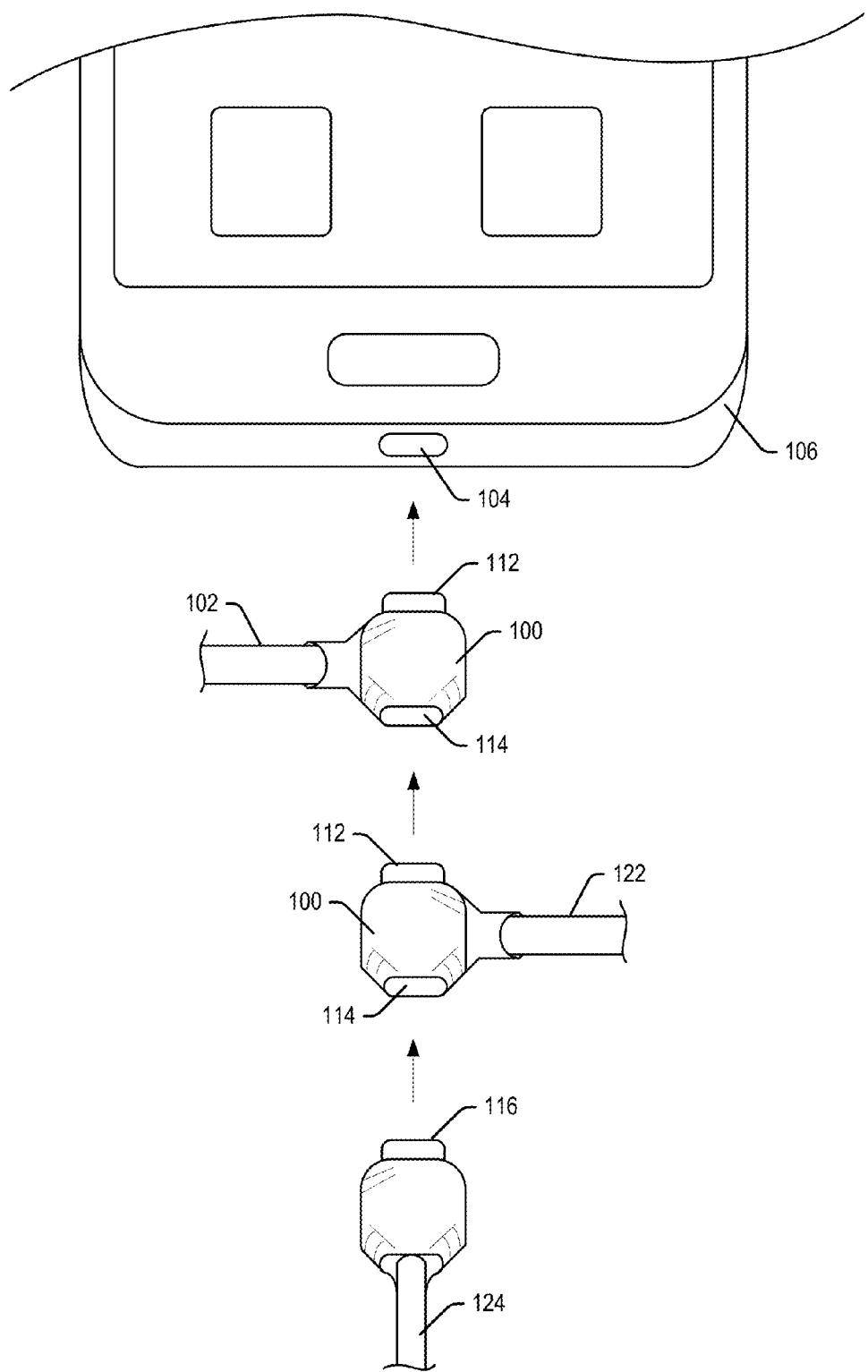
FIG. 7 is a perspective view of configuration employing multiple USB type-C connector assemblies in accordance with the present technology.

FIGS. 4-6 illustrate an embodiment including a single connector assembly 100 enabling simultaneous connection of first and second devices 102, 118 to the computing system 106. However, it is understood that more than one connector assembly 100 may be used to allow connection of more than two devices to the computing system 106. FIG. 7 illustrates one such embodiment including a pair of connector assemblies 100. The first connector assembly 100 is integrally attached to the device 102, and connects the device 102 to the port 104 of the computing system 106 via its connector 112.

In the embodiment of FIG. 7, a second USB type-C connector assembly 100 may be integrally attached to a second device 122, which may be any of the devices described above with respect to device 102. The second connector assembly includes a connector 112 for being received within the secondary port 114 of the first USB type-C connector assembly 100, to connect the second device 122 to the computing system 106. The second connector assembly 100 includes a secondary port 114 for receiving the connector 116 of a third device 124, which may be any of the devices described above with respect to the device 102. Thus, once all connectors are connected to the respective ports, the pair connector assemblies 100 enable three devices 102, 122 and 124 to connect to, and operate simultaneously with, the computing system 106. In further embodiments, n number of connector assemblies 100 may be daisy-chained together to connect n+1 devices to the computing system 106. The number n of connector assemblies 100 which may be used may be greater than two, but the number may be practically limited at some point by the resources of computing system 106 to work with a large number of devices simultaneously.

Figure 8:
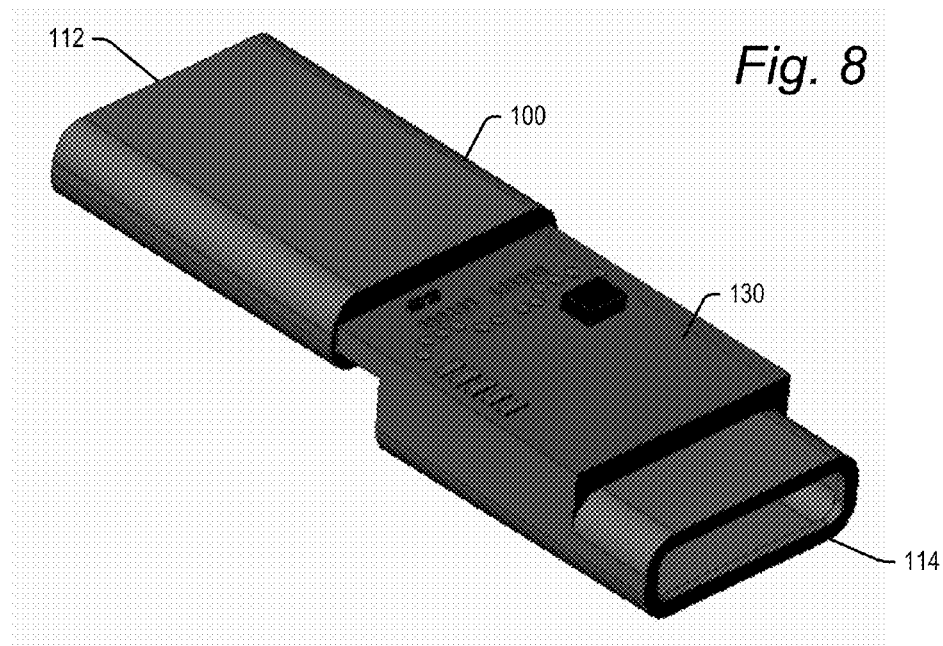
FIG. 8 is an internal view of the USB type-C connector assembly in accordance with embodiments of the present technology.
Figure 9:
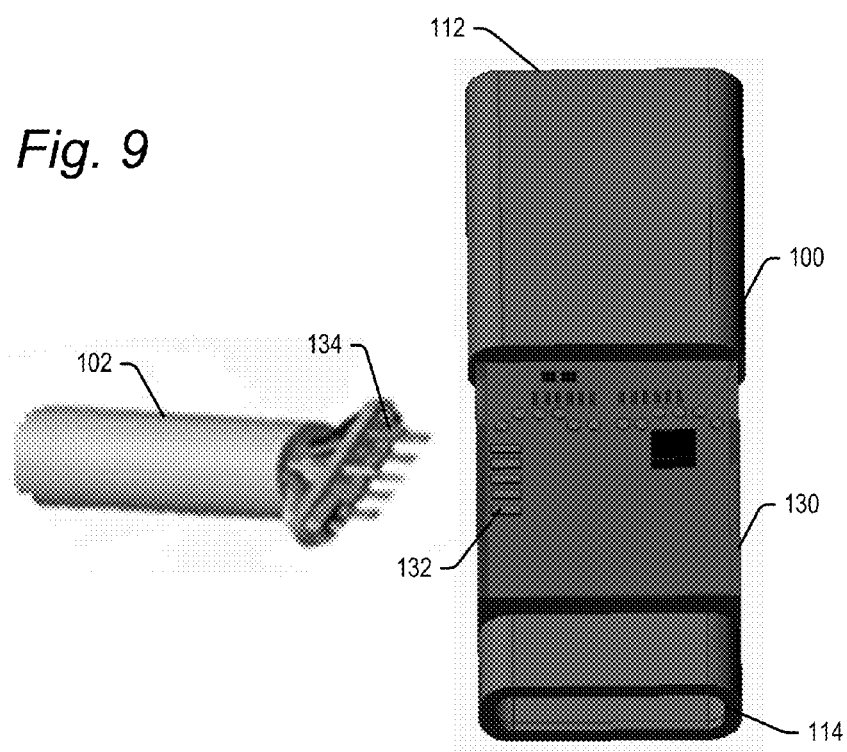
FIG. 9 is an internal view of the USB type-C connector assembly illustrating terminals for connection to an attached device.

FIGS. 8 and 9 illustrate interior views of the connector assembly 100 with a portion of the housing 110 removed. A printed circuit board (PCB) 130 is mounted within the interior of the connector assembly 100. The PCB 130 may include integrated circuits and other electronic components to support and implement functionality of the connector assembly.

For example, the PCB 130 may include circuits and/or other electronic components for identifying the attached device 102. The PCB 130 may further include circuits and components enabling the transfer of power to the attached device 102, and/or the transfer of signals to and/or from the attached device 102. In the example of FIG. 9, the device 102 integrally attached to the connector assembly 100 may be a headset. As such, the PCB 130 includes contact pads 132 for receiving leads 134 from the device 102 to support left and right channel audio from the computing system 106, and possibly microphone input from the headset device 102. The PCB may further include control and communications circuitry to control the audio output from the computing system 106 and the microphone input the headset device 102. The PCB 130 may include other or alternative circuits and components where the device 102 is another type of device.

As a second function, the PCB 130 may include circuits and components for identifying a second device 118 affixed to the secondary port 114. The PCB 130 may further include pass-through circuits and components enabling the transfer of power to the second device 118, and/or the transfer of signals to and/or from the second device 118.

Figure 10A:
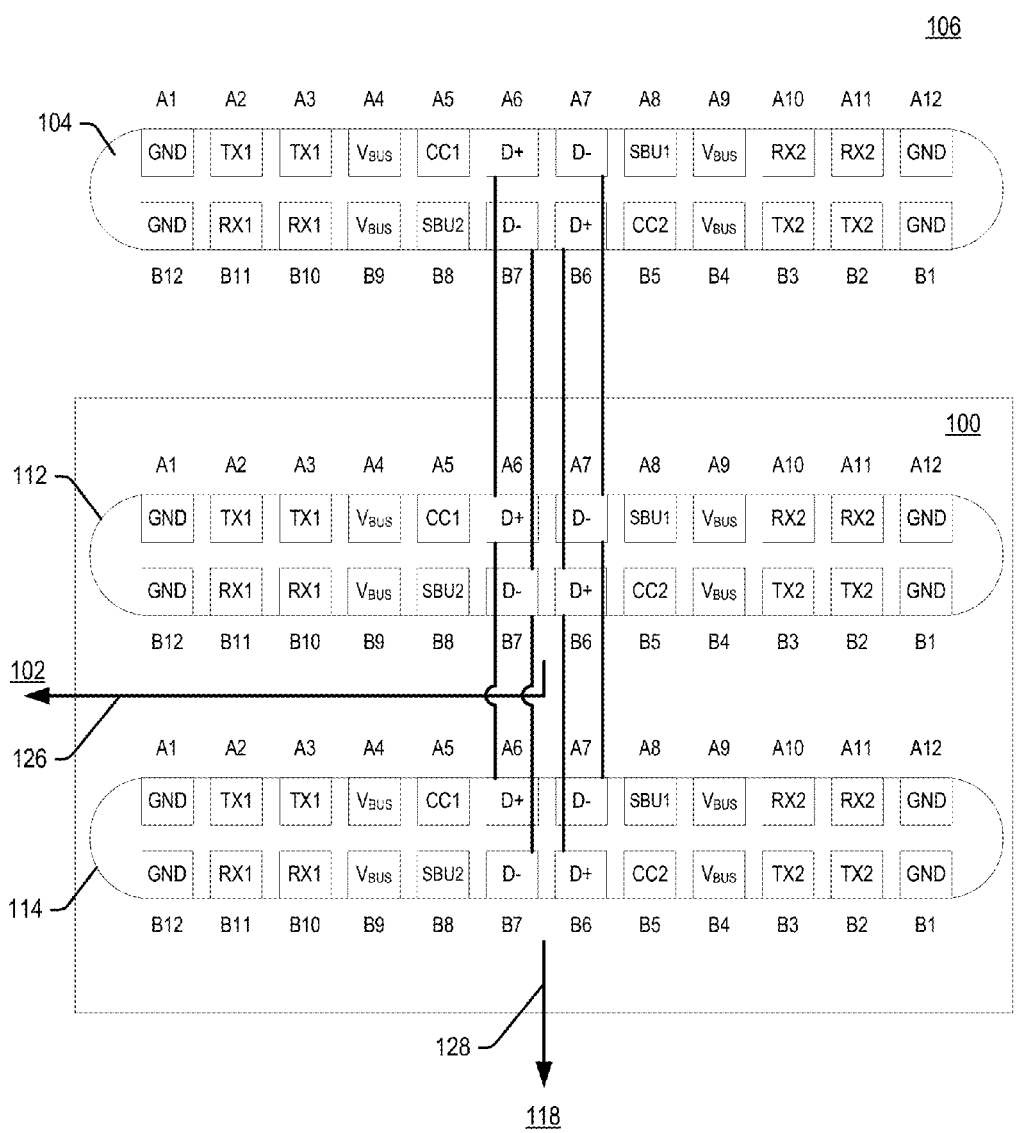
FIGS. 10A and 10B are examples of circuit diagrams and pin configurations of the USB type-C connector assembly in accordance with embodiments of the present technology.
Figure 10B:
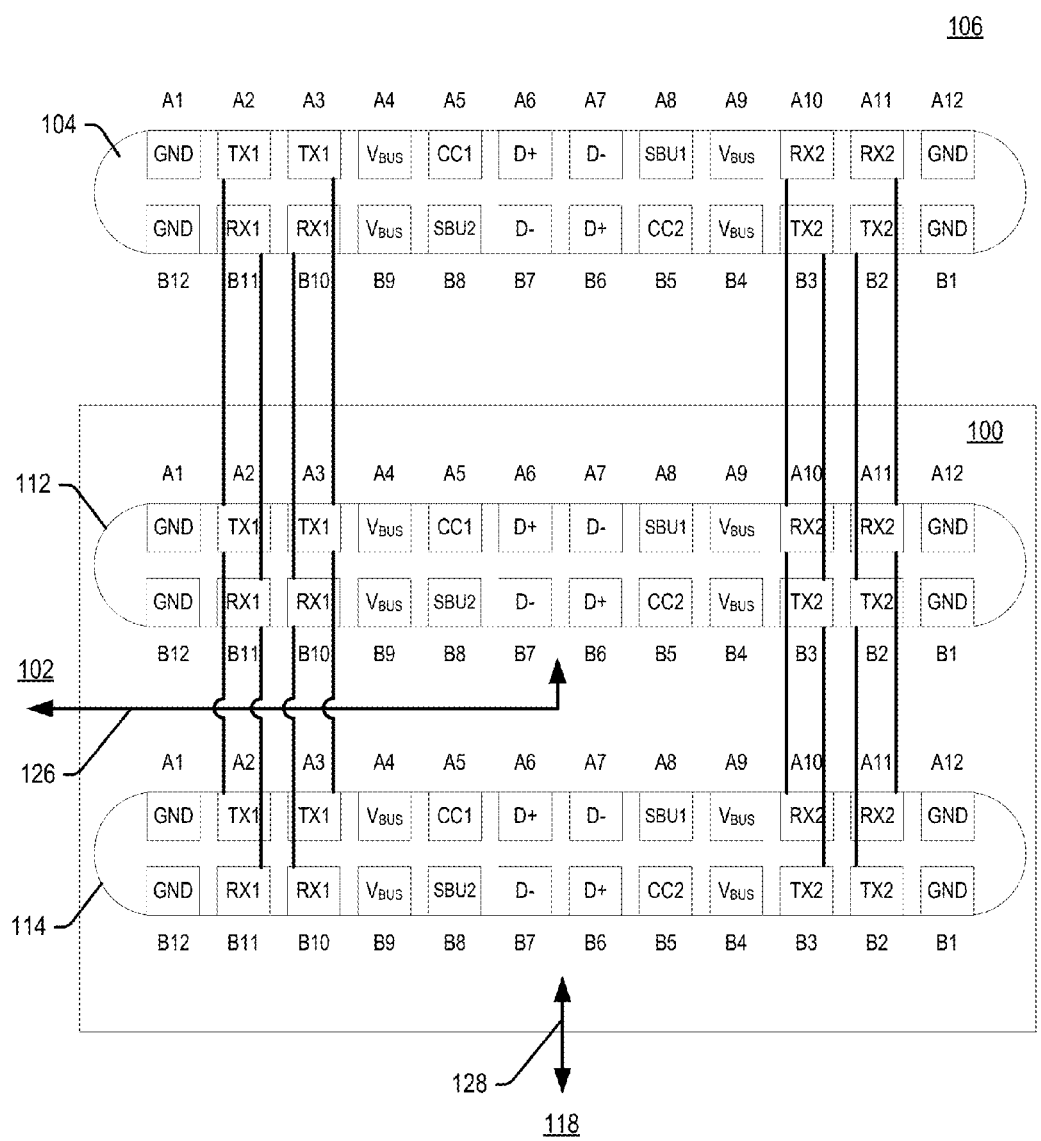

FIGS. 10A and 10B illustrate pin configurations and electrical connections of the connector 112 and secondary port 114 of the connector assembly 100. As noted, the connector 112 and the secondary port 114 may both be configured according to the USB type-C standard, which includes a first set of twelve pins (A1-A12). The connector according to the standard is reversible, and includes a reversed second set of twelve pins (B1-B12).

Each of the connector 112 and secondary port 114 include a pair of configuration channel pins (CC1/CC2) which are capable of serving a variety of functions. The configuration channel pins of the connector 112 detect whether the connector assembly 100 is affixed to the computing system 106. The configuration channel pins of the secondary port 114 detect whether a second device 118 is affixed to the secondary port. The configuration channel pins in the connector 112 may also be coupled to the configuration channel pins in the secondary port 114. Thus, the 'downstream' ports (i.e., port 104 of computing system 106) can determine when a device is plugged into an 'upstream' port (i.e., secondary port 114). The configuration channel pins can also detect connector orientation (which set of pins A or B is facing upwards). The configuration channel pins can also determine current mode (signal or power charging), and can supply power ($V_{CONN}$) to devices 102 and/or 118 affixed to the connector assembly 100.

Each of the connector 112 and secondary port 114 further includes four sets of power pins (four GND and four power $V_{BUS}$). Each of the connector 112 and secondary port 114 includes data pins—two sets of SuperSpeed differential pair pins (TX/RX), and one set of non SuperSpeed differential pair pins (D+/D−). FIG. 10A illustrates an example using the non SuperSpeed differential pair pins, such as in an example where the device 102 and/or 118 is an audio headset. In such an example, the computing system 106 supplies non SuperSpeed data signals which are transferred via the connector 112 to the device 102 (arrow 126). Power and/or signals are transferred from the computing system 106 through the connector 112 and secondary port 114 to the second device 118 (arrow 128).

FIG. 10B illustrates an example using the SuperSpeed differential pair pins, such as in an example where the device 102 and/or 118 is a memory card. In such an example, the computing system sends/receives SuperSpeed data signals which are transferred via the connector 112 to/from the device 102 (arrow 126). Power and/or signals are transferred from the computing system 106 through the connector 112 and secondary port 114 to the second device 118 (arrow 128).

In general, where the connector assembly 100 is used to affix a pair of devices 102, 118 to the computing system 106, the devices 102, 118 may be any combination of the devices described above with respect to device 102. As non-limiting examples, the device 102 may be a headset and/or microphone and the device 118 may be a battery charger. In further embodiments, both the device 102 and 118 may be headsets. Any of a wide variety of other combinations of devices 102, 118 may be used. Additionally, a device (102 or 118) utilizing the non SuperSpeed pins may be used with a device (102 or 118) utilizing the SuperSpeed pins. Where two devices 102, 118 are being used simultaneously, the control communications circuitry may transmit signals and/or power between the computing system 106 and devices 102, 118 simultaneously. Alternatively, the control circuitry may alternate (cycle) signals and/or power between the devices 102 and 118.

Figure 11:
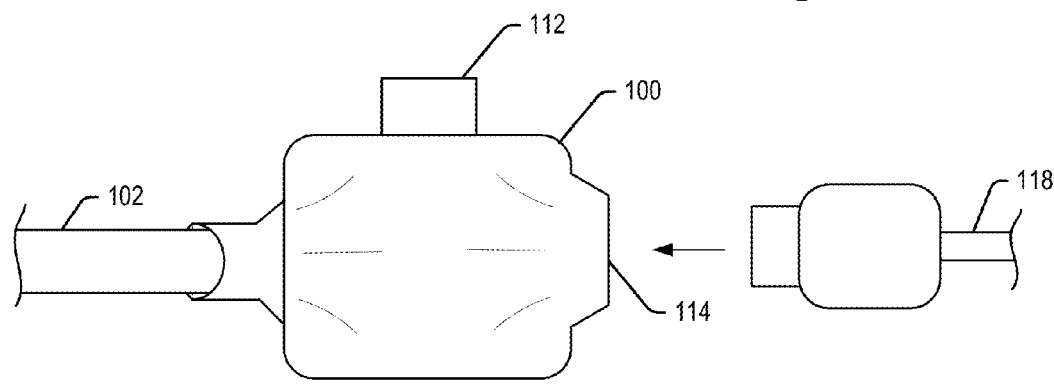
FIGS. 11-14 illustrate alternative embodiments of the USB type-C connector in accordance with the present technology.

In embodiments described above and shown for example FIG. 4, the connector 112 and secondary port 114 are axially aligned with each other along a common axis. However, the connector 112 and secondary port 114 need not be axially aligned with each other in further embodiments. For example, FIG. 11 is a top view of a further embodiment of the connector assembly 100 where the secondary port 114 for connecting to a second device 118 is offset 90° from the connector 112. The connector 112 and secondary port 114 may offset from each other by angles other than 90° in further embodiments.

Figure 12:
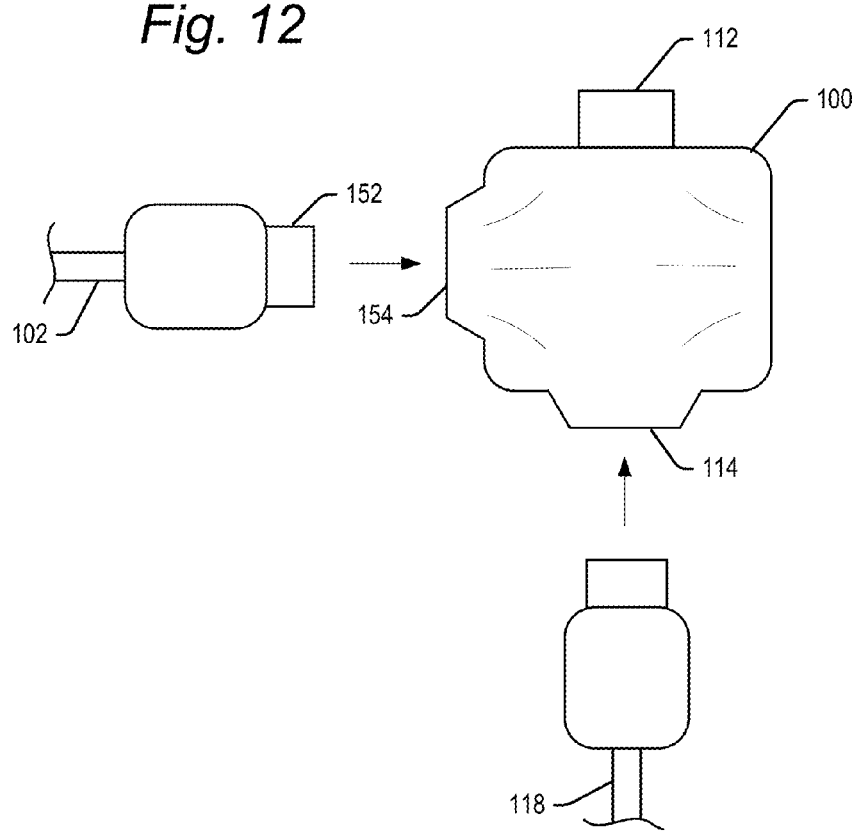

In embodiments described above, the device 102 is integrally attached to the connector assembly 100, for example by soldering leads 134 onto contact pads 132 on PCB 130 as shown in FIG. 9. However, in further embodiments, the device 102 need not be integrally attached the connector assembly 100. For example, FIG. 12 is a top view of a further embodiment of the connector assembly 100 where the device 102 includes a connector 152 for affixing to a port 154 on the connector assembly 100. The connector 152 and port 154 may be configured according to the USB type-C standard. The connector assembly 100 of FIG. 12 may also include the connector 112 for connecting to the computing system 106, and the secondary port 114 for connecting to a second device 118, as described above.

Figure 13:
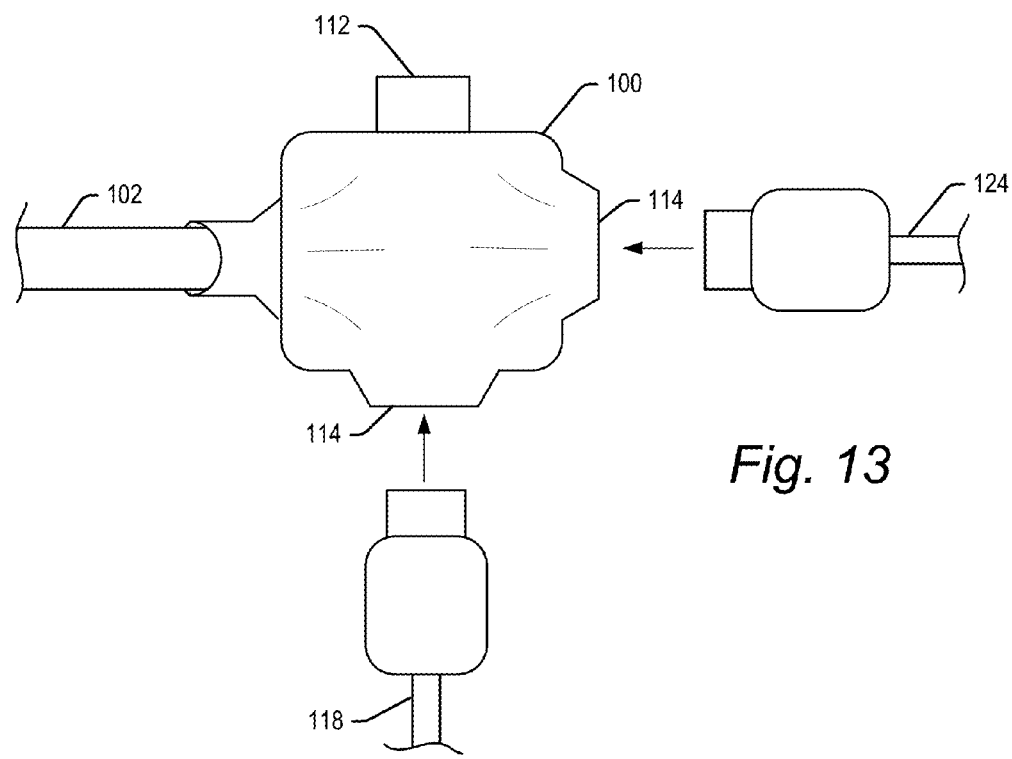
Figure 14:
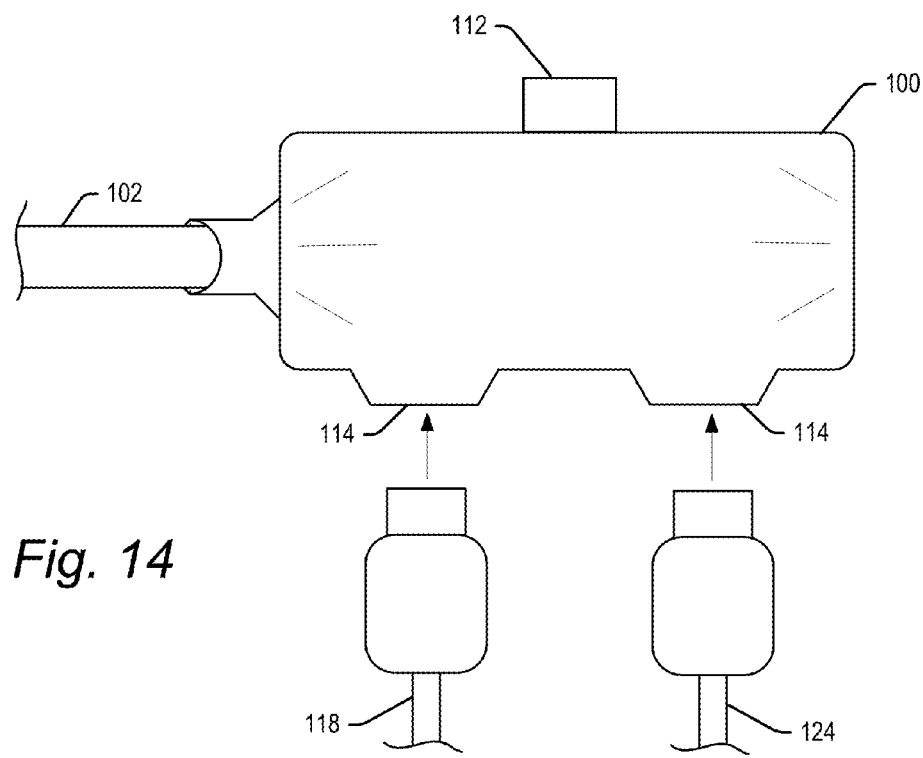

In embodiments described above, the connector assembly 100 includes a single secondary port 114 for affixing a single second device 118 to the computing system 106. However, in further embodiments, the connector assembly 100 may include more than one secondary port 114 for affixing multiple devices to the computing system 106 in addition to the attached device 102. FIGS. 13 and 14 are top views illustrating such an embodiment. FIG. 13 illustrates an embodiment including a pair of secondary ports 114, offset from each other by 90° around a pair of edges of the connector assembly 100. FIG. 14 illustrates an embodiment including a pair of secondary ports 114, aligned with each other along a common edge of the connector assembly 100. The connector assembly 100 of FIGS. 13 and 14 includes a connector 112 for affixing the connector assembly 100 to computing system, and an integrally attached device 102, as described above. The device 102 in the embodiment of FIGS. 13 and 14 may be removable instead of integrally attached, as shown for example in the embodiment of FIG. 12.

Figure 15:
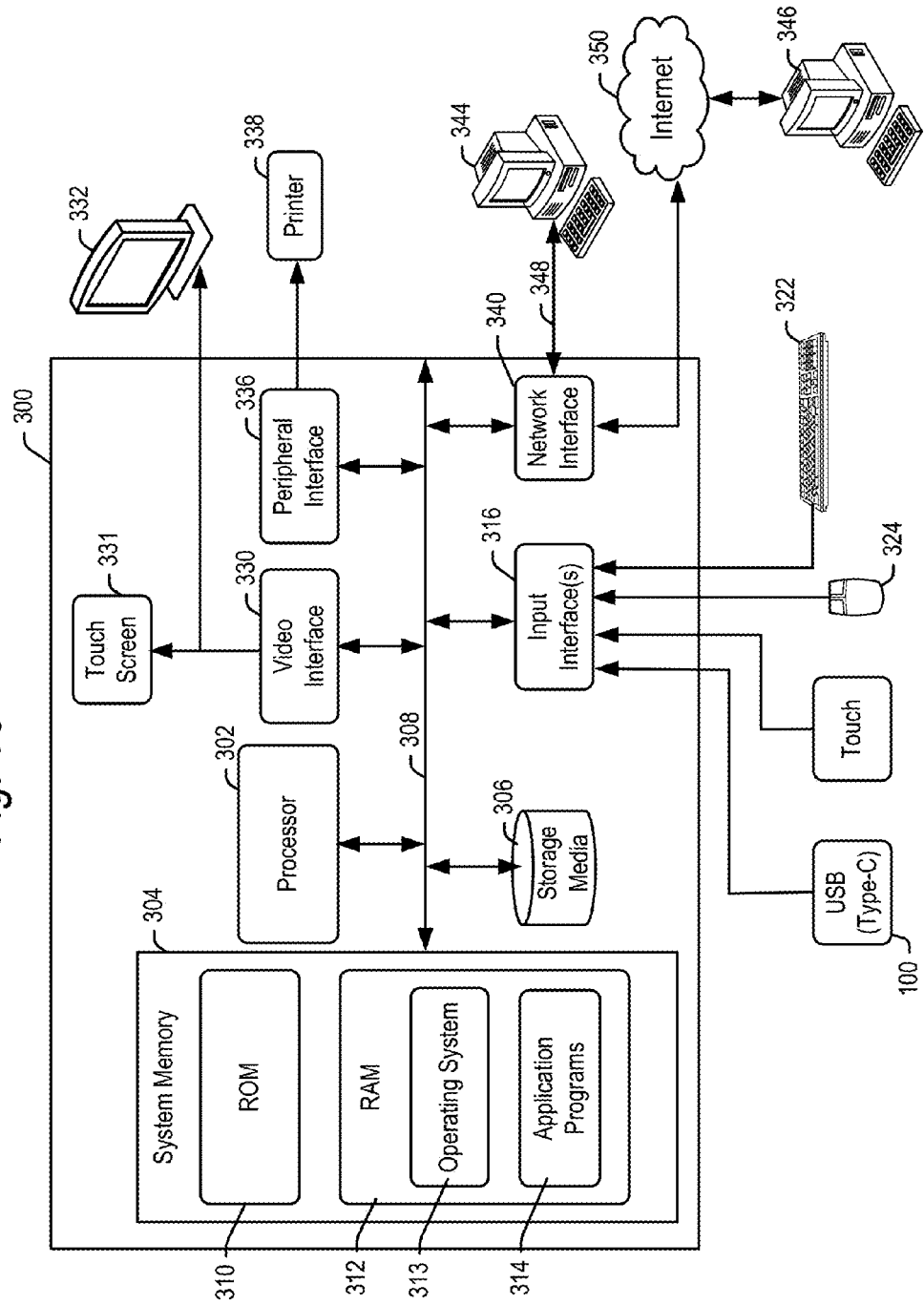
FIG. 15 is a block diagram of a sample computing environment which can make use of a connector assembly according to the present technology.

FIG. 15 illustrates details of a computing environment 300, which may be an example of computing system 106 for implementing aspects of the present technology. Components of computing environment 300 may include, but are not limited to, a processor 302, a system memory 304, computer readable storage media 306, various system interfaces and a system bus 308 that couples various system components. The system bus 308 may be any of several types of bus structures including a memory bus or memory controller, a peripheral bus, and a local bus using any of a variety of bus architectures.

The computing environment 300 may include computer readable media. Computer readable media can be any available tangible media that can be accessed by the computing environment 300 and includes both volatile and nonvolatile media, removable and non-removable media. Computer readable media does not include transitory, modulated or other transmitted data signals that are not contained in a tangible media. The system memory 304 includes computer readable media in the form of volatile and/or nonvolatile memory such as ROM 310 and RAM 312. RAM 312 may contain an operating system 313 for computing environment 300. RAM 312 may also execute one or more application programs 314. The computer readable media may also include storage media 306, such as hard drives, optical drives and flash drives.

The computing environment 300 may include a variety of interfaces for the input and output of data and information. Input interface 316 may receive data from different sources including touch (in the case of a touch sensitive screen), a mouse 324 and/or keyboard 322. The input interface may further receive input from a USB device, such as via the USB type-C connector assembly 100 of the present technology. A video interface 330 may be provided for interfacing with a touchscreen 331 and/or monitor 332, such as display 160. A peripheral interface 336 may be provided for supporting peripheral devices, including for example a printer 338.

The computing environment 300 may operate in a networked environment via a network interface 340 using logical connections to one or more remote computers 344, 346. The logical connection to computer 344 may be a local area connection (LAN) 348, and the logical connection to computer 346 may be via the Internet 350. Other types of networked connections are possible, including broadband communications as described above. It is understood that the above description of computing environment 300 is by way of example only, and may include a wide variety of other components in addition to or instead of those described above.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A connector assembly for connecting to a USB type-C port of a user device, comprising:
a cord having a first end integrated into a first device and a second end, opposite the first end, integrated into the connector assembly;
a USB type-C connector formed on the connector assembly, the USB type-C connector configured to connect the first device to the user device through the USB type-C port of the user device; and
a secondary port formed in the connector assembly, the secondary port configured to receive a connector of a second device to connect the second device to the user device through the USB type-C port of the user device, the connector assembly configured to simultaneously transmit signals from the user device to the first and second devices.

2. The connector assembly of claim 1, wherein the secondary port of the connector assembly is a USB type-C port for receiving a USB type-C connector of the second device.

3. The connector assembly of claim 1, further comprising control communications circuitry for identifying the first and second devices upon connection to the connector assembly and connection of the connector assembly to the user device.

4. The connector assembly of claim 1, further comprising a housing for supporting the USB type-C connector and defining an opening of the secondary port.

5. The connector assembly of claim 1, further comprising one or more electronic components for identifying the second device upon the connector of the second device being received within the secondary port.

6. The connector assembly of claim 1, wherein the first device is one of a headset, a microphone, a battery charger, a memory card, an audiovisual device and a connector cable.

7. The connector assembly of claim 6, wherein the second device is one of a headset, a microphone, a battery charger, a memory card, an audiovisual device and a connector cable.

8. The connector assembly of claim 1, wherein the USB type-C connector is axially aligned with the secondary port.

9. The connector assembly of claim 1, wherein the USB type-C connector is axially offset at an angle with respect to the secondary port.

10. The connector assembly of claim 1, further comprising a further secondary port for receiving a connector of a third device to connect the third device to the user device through the USB type-C port of the user device.

11. A connector assembly for connecting to a USB type-C port of a user device, comprising:
a first electrical cord having a first end integrated into a first device and a second end, opposite the first end, integrated into the connector assembly;
a USB type-C connector, formed on the connector assembly, for connecting the first device to the user device through the USB type-C port of the user device;
a second electrical cord to connect a second device with the user device; and
a USB type-C secondary port formed in the connector assembly for receiving a connector on the second electrical cord of the second device to connect the second device to the user device through the USB type-C port of the user device, the connector assembly configured to simultaneously transmit signals from the user device to the first and the second devices.

12. The connector assembly of claim 11, wherein the first device is one of a headset, a microphone, a battery charger, a memory card, an audiovisual device and a connector cable.

13. The connector assembly of claim 12, wherein the second device is one of a headset, a microphone, a battery charger, a memory card, an audiovisual device and a connector cable.

14. The connector assembly of claim 11, the first electrical circuit further comprising first control communications circuitry for identifying the first device upon electrical connection of the first device to the connector assembly and connection of the connector assembly to the user device.

15. The connector assembly of claim 14, the second electrical circuit further comprising second control communications circuitry for identifying the second device upon electrical connection of the second device to the connector assembly and connection of the connector assembly to the user device.

\* \* \* \* \*